United States Patent
Wei et al.

(10) Patent No.: US 7,993,594 B2
(45) Date of Patent: Aug. 9, 2011

(54) MULTISTAGE REACTORS FOR CONTINUOUS PRODUCTION OF CARBON NANOTUBES

(75) Inventors: Fei Wei, Beijing (CN); Yi Liu, Beijing (CN); Weizhong Qian, Beijing (CN); Guohua Luo, Beijing (CN)

(73) Assignee: Tsinghua University, Beijing (CN)

( * ) Notice: Subject to any disclaimer, the term of this patent is extended or adjusted under 35 U.S.C. 154(b) by 55 days.

(21) Appl. No.: 12/516,166

(22) PCT Filed: Apr. 18, 2008

(86) PCT No.: PCT/CN2008/000805
§ 371 (c)(1),
(2), (4) Date: May 22, 2009

(87) PCT Pub. No.: WO2008/128437
PCT Pub. Date: Oct. 30, 2008

(65) Prior Publication Data
US 2010/0316556 A1  Dec. 16, 2010

(30) Foreign Application Priority Data

Apr. 18, 2007  (CN) .......................... 2007 1 0098478

(51) Int. Cl.
*B01J 8/18*  (2006.01)
*D01F 9/12*  (2006.01)

(52) U.S. Cl. ........ 422/141; 422/142; 422/144; 422/145; 422/156; 423/447.1; 423/445 B; 423/447.3; 977/742; 977/842; 977/843

(58) Field of Classification Search .................. 422/141, 422/142, 144, 145, 156; 423/447.1, 445 B, 423/447.3; 977/742, 840, 842, 843
See application file for complete search history.

(56) References Cited

U.S. PATENT DOCUMENTS

| | | | |
|---|---|---|---|
| 4,767,737 A * | 8/1988 | Brooks ......................... 502/185 |
| 6,413,487 B1 * | 7/2002 | Resasco et al. ............ 423/447.3 |
| 2002/0180360 A1 | 12/2002 | Zollars |
| 2004/0095082 A1 | 5/2004 | Zollars |
| 2004/0151654 A1 * | 8/2004 | Wei et al. ................... 423/447.3 |
| 2005/0062195 A1 | 3/2005 | Chao |
| 2006/0086834 A1 * | 4/2006 | Pfeffer et al. ..................... 241/5 |
| 2007/0031299 A1 | 2/2007 | Jiang |
| 2009/0051267 A1 | 2/2009 | Kato |

FOREIGN PATENT DOCUMENTS

EP  1591570 A1 * 11/2005
JP  2004019018 A * 1/2004

OTHER PUBLICATIONS

Weizhong et al. Production of hydrogen and carbon nanotubes from methane decomposition in a two-stage fluidized bed reactor. Applied Catalysis A: General 260 (2004) 223-228.*
See et al. A Review of Carbon Nanotube Synthesis via Fluidized-Bed Chemical Vapor Deposition. Ind. Eng. Chem. Res. 2007, 46, 997-1012.*

* cited by examiner

*Primary Examiner* — Jennifer A Leung
(74) *Attorney, Agent, or Firm* — SV Patent Service

(57) ABSTRACT

The present application provides multistage and multilayer reactors useful for the efficient and continuous production of carbon nanotubes and methods of using the apparatus in the preparation of carbon nanotubes. In one aspect, the multistage reactors include an array of interconnected fluidized-bed reactors. The multilayer reactors include a plurality of reaction zones.

25 Claims, 11 Drawing Sheets

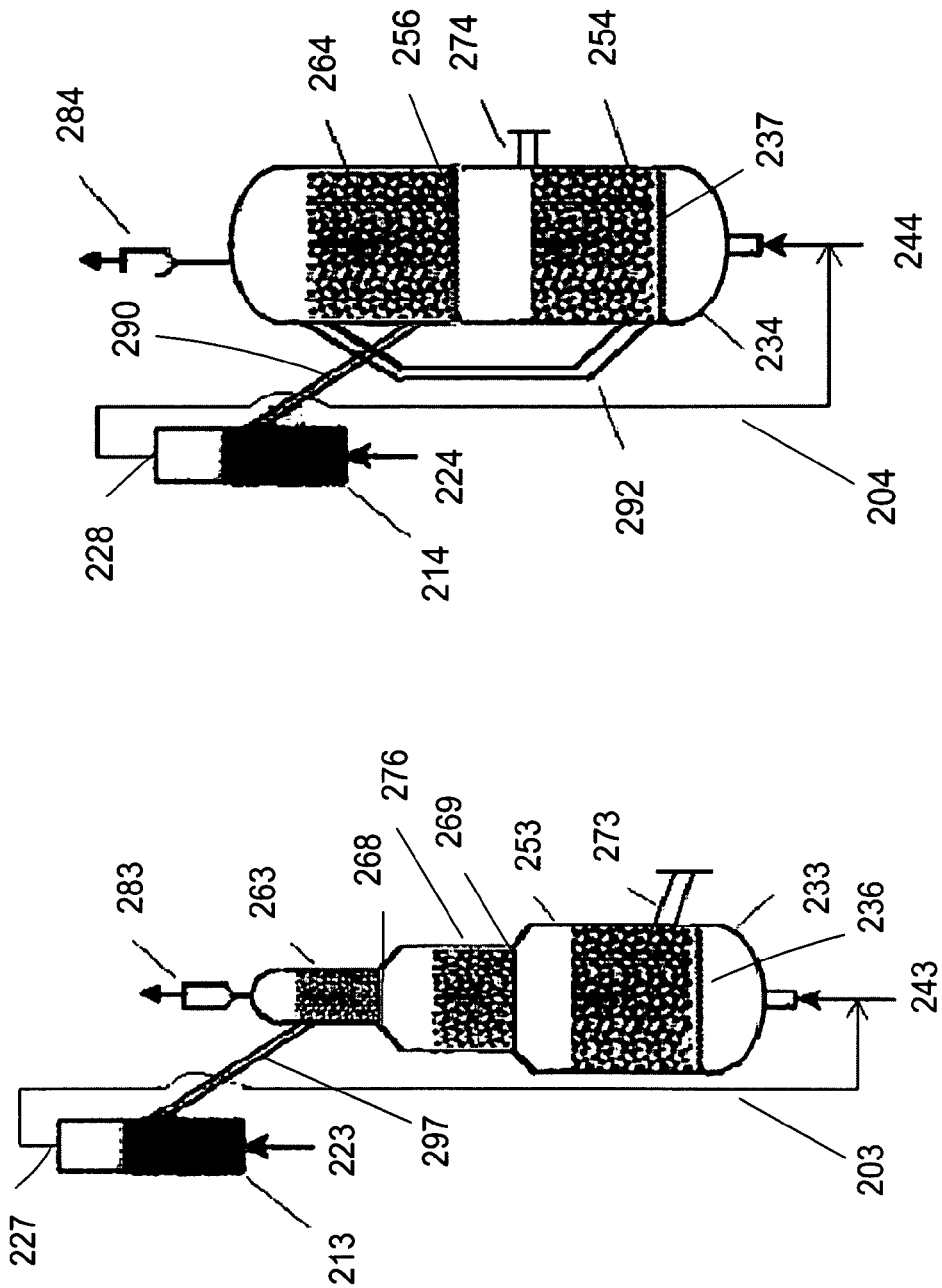

MULTISTAGE REACTORS FOR CONTINUOUS PRODUCTION OF CARBON NANOTUBES

CROSS-REFERENCE TO RELATED APPLICATIONS

The present application is a national-entry application based on and claims priority to PCT Patent Application PCT/CN2008/000805, entitled "Multistage reactors for continuous production of carbon nanotubes" by the same inventors, filed Apr. 18, 2008, which claims priority to Chinese Patent Application No. 200710098478.2, filed Apr. 18, 2007. The content of these applications is incorporated herein by reference.

BACKGROUND

The present disclosure relates to systems and methods for large-scale production of carbon nanotube materials.

Nanotube growth process involves significant volume expansion. For example, a volume expansion of 50~5,000 times of the starting materials has been observed. Due to the volume expansion, the corresponding density of the solid materials can drop about 1~2 orders of magnitude. The change in density typically results in significant differences in the fluidization properties of the particles. Therefore, it remains a challenge to provide continuous production of carbon nanotubes of various densities.

Since the process for nanotube growth accompanies by a gradual loss of catalysts activity and decreased conversion, new catalysts must be supplied to the reaction system in order to increase the conversion for continuous production of carbon nanotubes. However, the newly added catalysts and the crude products have very different densities, and require different fluidization conditions. When the superficial velocity is high, the initial low-density products, such as agglomerates, can migrate out of the reactor with the flow of the gases. This will result in several disadvantages, for example, insufficient reaction time, low growth ratio per gram of catalyst and low efficiency of catalyst utilization. When the superficial velocity is low, the fresh catalysts cannot be used efficiently, which will result in low productivity, poor fluidization condition, elutriation, poor heat transport, and coagulation of the solid particles.

Maintaining proper fluidization conditions is critical for the production of carbon nanotubes. During the initial growth stage of carbon nanotubes, poor catalyst fluidization can lead to the formation of aggregates or chunks, which result in the blockage of the reactor. In the later growth stage of carbon nanotubes, the density of the materials decreases drastically. The particles are loose and easily aggregated together. The coagulation of the particles can result in poor fluidization conditions. There is therefore a need for improved fluidization conditions for all particles in the reaction system in a continuous production of carbon nanotubes.

SUMMARY

In one aspect, the present invention provides a multistage reaction apparatus for continuous production of carbon nanotubes. The apparatus includes a catalyst activation reactor having a activation feed inlet and a catalyst gas outlet; an array of n interconnected fluidized bed reactors having a first fluidized-bed reactor, a second fluidized-bed reactor, a third fluidized-bed reactor, ... an (n-1) fluidized-bed reactor, an nth fluidized-bed reactor (i.e. a last fluidized-bed reactor), wherein each fluidized-bed reactor includes a reaction feed inlet positioned at the fluidized-bed reactor, a gas distributor mounted inside the fluidized-bed reactor, optionally one or more plate distributors mounted inside the individual fluidized-bed reactor and an exhaust gas-solid separator outlet positioned at the individual fluidized-bed reactor; wherein the reaction feed inlet of each fluidized-bed reactor is connected to the gas-solid separator outlet of a subsequent adjacent reactor; a plurality of circulating tubes, wherein each of the plurality of circulating tubes is connected to two adjacent fluidized-bed reactors; a product gas-solid separator positioned at the last fluidized-bed reactor; n is an integer equal to or greater than 2; and wherein the first fluidized-bed reactor is positioned at the catalyst activation reactor.

In another aspect, the present invention provides a multilayer reaction apparatus for continuous production of carbon nanotubes. The apparatus includes a catalyst activation reactor having an activation feed inlet and a catalyst gas outlet; a fluidized-bed reactor having a plurality of zones, which includes a first reaction zone, a second reaction zone, a third reaction zone, ... an (m-1) reaction zone and an mth reaction zone (i.e. a last reaction zone). m is an integer of at least 2. The multilayer reaction apparatus also includes a gas distributor mounted inside the fluidized-bed reactor; at least one plate distributor mounted within the fluidized-bed reactor to separate the plurality of zones; a main feed inlet mounted on the fluidized-bed reactor; an exhaust gas outlet mounted on the fluidized-bed reactor, wherein the exhausted gas outlet is optionally coupled to a first gas-solid separator; a product outlet mounted on the fluidized-bed reactor, wherein the product outlet is optionally coupled to a second gas-solid separator; and wherein the catalyst activation reactor is in fluidic communication with the fluidized-bed reactor; the catalyst gas outlet is optionally connected to the main feed inlet; and the first zone is next to the main feed inlet and the last zone is positioned near the exhaust gas outlet.

In yet another aspect, the present invention provides an apparatus for continuous production of carbon nanotubes. The reactor includes a catalyst storage reactor having an activation feed gas inlet and a catalyst gas outlet, each of which is mounted on the catalyst storage reactor; a main fluidized-bed reactor comprising a main feed-gas inlet, a main exhaust gas outlet, a product outlet, each of which is mounted on the main fluidized-bed reactor; a riser connected to the catalyst storage reactor and the main fluidized-bed reactor; and wherein the catalyst gas outlet of the catalyst storage reactor is connected to the main feed-gas inlet of the main fluidized-bed reactor.

In still another aspect, the present invention provides a multistage reactor for continuous production of carbon nanotubes. The reactor includes a catalyst activation reactor having an activation feed inlet and a catalyst gas outlet; a main feed gas inlet; a main reactor having a plurality of reaction zones, wherein the main feed gas inlet is positioned near a first reaction zone and the activation feed inlet is connected to a first or a last reaction zone of the main reactor; a stirring device mounted on the main reactor, wherein the stirring device comprises a plurality of stirring blades and a movable gas seal; a gas-solid separator attached the main reactor; and a product outlet mounted on the main reactor.

In a further aspect, the present invention provides a method for continuous production of carbon nanotubes. The method includes providing a multistage reaction apparatus; and administering a feed gas, a reducing gas, an inert gas and an activated catalyst to the multistage reaction apparatus under conditions sufficient to prepare the carbon nanotubes.

Compared to single-stage reactors, the disclosed multistage and/or multilayer reactors offer the advantage of improved the fluidization properties of the solid materials. For example, multistage reactors are capable of avoiding or reducing the undesirable type of entire and return mixings or back-mixings of gases and solids in the reactors, thus, lead to a significant increase in the conversion of feed gases. The disclosed multistage and/or multilayer reactors are useful in large-scale production of carbon nanotubes because they can handle volume expansion and frequent additions and extractions of solids.

The disclosed multistage and multilayer reactors allow the control of distribution of catalysts and carbon nanotubes as well as fluidization conditions of each reactor and for each reaction zone within the reactor. Fluidization and nanotubes growth processes are optimized for continuous operation. As a result, the disclosed systems and methods can achieve high conversions and productivities. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The following drawings, which are incorporated in and form a part of the specification, illustrate embodiments of the present invention and, together with the description, serve to explain the principles of the invention.

FIGS. 2A-2E illustrate one type of multilayer or multi-zone fluidized-bed reactors used for the production of carbon nanotubes.

FIG. 3A shows multilayer reactors joined together by two circulating tubes.

FIG. 3B shows a multilayer reactor having three reaction zones connected to another multilayer reactor having two reaction zones.

DETAILED DESCRIPTION

Figure 1:
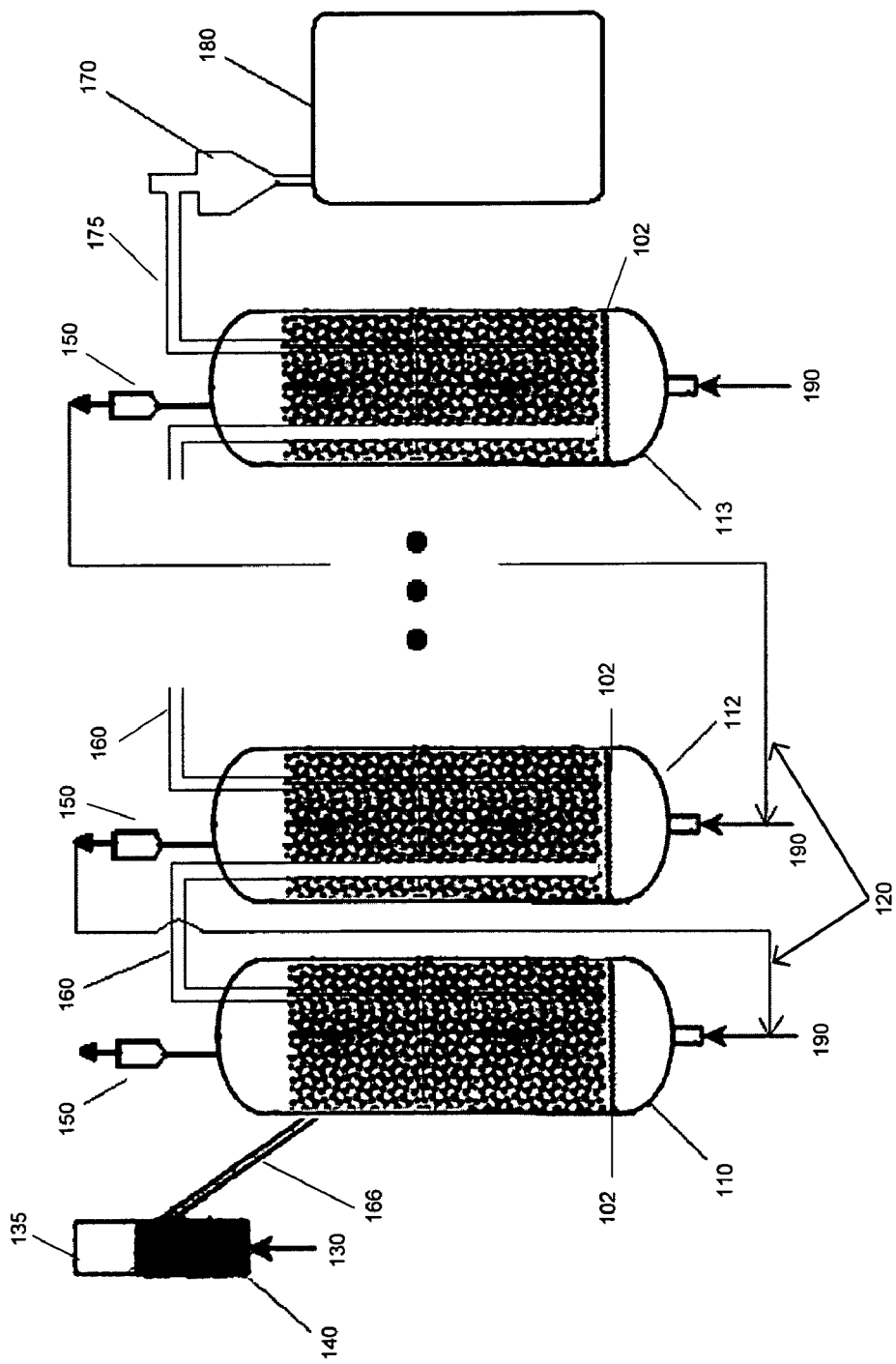
FIG. 1 illustrates a multistage reaction apparatus used for the production of carbon nanotubes. The apparatus includes a series of interconnected fluidized-bed reactors.

The present invention provides multistage, multilayer or multi-zone reactors and methods of using such reactors for continuous production of carbon nanotubes in high yields and conversions. The multistage reactors can include a combination of a series of interconnected single reactors. In one embodiment, the reactors are connected through circulating tubes. The multilayer or multi-zone reactors can have a plurality of reaction zones or layers within the reactor, where the solid materials exhibit different densities at each reaction zone or layer and the gas flow can achieve tunable velocity within each zone.

Compared to single-stage reactors, the multistage reactors and multilayer reactors of the present invention offer the advantages of tuning and controlling the space velocity and superficial velocity, contact countercurrent (i.e. reverse gas flowing contact) within the multilayer fluidization-bed, realization of fluidization at different reactors and separate zones of each reactor, and achieving a high feed gas conversion.

During the preparation of carbon nanotubes, a large amount of hydrogen has been produced. The hydrogen produced is useful as industrial materials. In order to improve the conversion of carbon gas and hydrogen yield, the design of the reactors should avoid fluidization-bed with back-mixing type of contact. In comparison, plug flow and reverse flow contact of solid and gas can significantly improve the conversion of a feed gas. In addition, nitrogen, carbon monoxide and carbon dioxide can be used as mixing gases to slow down the deactivation of the catalysts and adjust the compositions of the exhaust gas. For example, the mixture of $CO$, $CO_2$ and $H_2$ produced is a useful synthetic gas, which can be used for the synthesis of methyl ether, 2-propylene or in the steel manufacturing industry.

Without being bound by any theory, hydrogen and carbon monoxide have significant effect on the catalysts activities towards generating single, double or a few walls carbon nanotubes in the initial nucleation stage. In certain instances, high concentration of hydrogen is necessary to promote the nucleation for the growth of nanotubes. In other instances, high concentrated hydrogen must be avoided for creating excess reduction and causing the active components to coagulate, which are unfavorable to the formation and controllable preparation of single and double wall carbon nanotubes. In the initial nucleation stage, a high space velocity of hydrocarbon gas is needed, but in the later stage, a low space velocity of hydrocarbon gas is necessary in order to improve the conversion of the feed gas. The difference between the high and low space velocities in the initial and later reaction stages can be between about 2 and 100 times. It is difficult to handle the huge difference in space velocity using a single reactor. The present invention contemplates the design of multistage and multilayer reactors that are surprisingly capable of adapting the difference in space velocity and handling the use of hydrocarbon gas or liquid as raw material, where the decomposition process can produce massive amount of hydrogen, which may in turn affect the activity of the catalysts.

In one aspect, the present invention provides a multistage reaction apparatus for continuous production of carbon nanotubes. As shown in FIG. 1, the apparatus includes a catalyst activation reactor 140 having an activation feed inlet 130 and a catalyst gas outlet 135, and an array of n interconnected fluidized-bed reactors, such as a first fluidized-bed reactor 110, a second fluidized-bed reactor 112, a third fluidized-bed reactor, ... and an nth fluidized-bed reactor 113 (i.e. a last fluidized-bed reactor). In one embodiment, the n reactors are arranged and connected sequentially. The first fluidized-bed reactor is attached to the catalyst activation reactor. Each individual fluidized-bed reactor includes a reaction feed inlet 190 attached to the reactor, a gas-solid distributor 150, optionally independently one or more plate distributors mounted inside the reactor for creating a plurality of reaction zones and an exhaust gas-solid separator outlet 175 attached to the reactor. The reaction feed inlet of each individual fluidized-bed reactor is connected to the gas-solid separator outlet of a subsequent adjacent reactor, for example, through a circulating tube 120. The apparatus include a plurality of circulating tubes 160, wherein each of the plurality of circulating tubes is connected to two adjacent fluidized-bed reactors. One end of a product outlet is attached to the nth fluidized-bed reactor (the last fluidized bed reactor) and the other end of the product outlet is optionally attached to the product gas-solid separator 170. The gas-solid separator is further connected to a storage device 180, such as a container. n is an integer equal to or greater than 2. The present invention provides multistage apparatus that can include a combination of any number of individual reactors. In one embodiment, n is an integer from 2 to 1000. In another embodiment, n is an integer from 2 to 100. In yet another embodiment, n is an integer from 2 to 50. In still another embodiment, n is an integer from 2 to 20, such as 2, 3, 4, 5, 6, 7, 8, 9, 10, 11, 12, 13, 14, 15, 16, 17, 18, 19 or 20.

In one embodiment, the reaction feed inlet is attached to the bottom of each fluidized-bed reactor and the exhaust gas-solid separator outlet is attached to the top of each fluidized-bed reactor. In another embodiment, the plurality of circulating tube is a straight or a spiral pipe. In yet another embodiment, the gas-solid separator is a cyclone separator. In still another embodiment, the plurality of reactors is a vessel having a uniformed diameter, for example, a cylindrical or metal pipe having a uniformed diameter. The reactor vessel can also have rectangle or square shape cross-sections.

In one embodiment, each reactor can include a series or a plurality of reaction zones within the reactor. For example, the reactor can have m reaction zones, such as a first reaction zone, a second reaction zone, a third reaction zone . . . an (m-1) reaction zone and an m reaction zone. The m reaction zone is also a last reaction zone. m is an integer of at least 2. For example, m is an integer from 2 to 100. In one instance, at least one reactor includes a plurality of reaction zones. In another instance, each reactor includes a plurality of reaction zones.

In another embodiment, each of the reaction zones has a dimension, wherein the dimension of the series or plurality of reaction zones increases from the first reaction zone to the last reaction zone. In yet another embodiment, the dimension of the series or plurality of reaction zones decreases from the first reaction zone to the last reaction zone.

In yet another embodiment, at least one reactor further comprises a stirring device. The stirring device can be a mechanical stirrer, an electrical field or a magnetic field.

In one embodiment, the multistage reactor comprises two reactors. The first reactor has a first reaction zone and a second reaction zone; the second reactor has a first reaction zone, a second reaction zone and an inner circulating tube connected to the first reaction zone and the second reaction zone of the second reactor; and wherein the first reaction zone of the first reactor is connected to the second reaction zone of the second reactor and the second reaction zone of the first reactor is connected to the first reaction zone of the second reactor. The first reaction zone is generally a lower reaction zone and the second reaction zone is an upper reaction zone when the reactor is oriented in an upright position. In certain instances, the reaction zones are connected through circulating tubes.

In another embodiment, the multistage reactor comprises two reactors. The first reactor has a first reaction zone, a second reaction zone and a third reaction zone; the second reactor has a first reaction zone, a second reaction zone and an inner circulating tube connected to the first reaction zone and the second reaction zone of the second reactor; and wherein the second reaction zone of the first reactor is connected to the first reaction zone of the second reactor and the first reaction zone of the first reactor is connected to the second reaction zone of the second reactor. In certain instances, the first reaction zone is also a lower reaction zone, the second reaction zone is a middle reaction zone and the third reaction zone is an upper reaction zone when the reactor is oriented in an upright position. In certain other instances, the reaction zones are connected through circulating tubes.

FIG. 1 shows a multistage reaction apparatus according to an embodiment of the present invention. Catalyst activation reactor 140 has an activation feed inlet 130 and a catalyst gas outlet 135. The activation feed inlet 130 is also a gas inlet to allow the passage of reactive gases, such as hydrogen or a mixture of gases containing hydrogen, nitrogen and/or an inert gas, such as a noble gas including argon. In one embodiment, the catalyst activation reactor is heated to 400° C.-600° C. under a stream of hydrogen or a mixture of gases containing hydrogen to produce activated metal nanoparticles. The catalyst activation reactor 140 is connected to the first stage reactor 110 through a circulating tube 166. The catalyst activation reactor can be connected to either the top or the bottom of reactor 110, preferably to the top of reactor 110.

The first stage reactor 110 has a feed gas inlet 190, a gas distributor 102 and a gas-solid separator 150 having an exhaust gas outlet. The feed gas can be either a gas or a liquid. Similarly, other subsequent reactors, such as the second stage reactor 112 also has a feed gas inlet 190, a gas distributor 102 and a gas-solid separator 150 having an exhaust gas outlet. Reactors 110 and 112 are connected through a circulating tube 160. Optionally, the feed gas inlet 190 of the first reactor is connected to the exhaust gas outlet of the gas-solid separator 150 connected to the second stage reactor 112 through a conduit 120. The conduit can be any pipe or tube for passing through a gas. As shown in FIG. 1, each pair of subsequent adjacent reactors is connected through a circulating tube 160. In an array of n interconnected reactors, each subsequent reactor preferably has an enlarged diameter than the previous reactor. The diameter ratios of the adjacent reactors range from 1.5 to 3. The product gas-solid separator 170 is coupled to the last reactor, for example, through a product outlet 175. The product gas-solid separator 170 is optionally attached to a container 180 for storing the product. The product gas-solid separator 170 can be a cyclone separator. The reactor can have a diameter from about 100 mm to about 1000 mm, such as 100, 150, 200, 250, 300, 350, 400, 450, 500, 550, 600, 650, 700, 750, 800, 850, 900, 950, or 1000 mm. The reactor can have a height from about 0.5 m to about 5 m, such as 0.5, 0.6, 0.7, 0.8, 0.9, 1, 1.5, 2, 2.5, 3, 3.5, 4, 4.5 or 5 m.

In one embodiment, the present invention contemplates the use of a magnetic field to improve the fluidization of the catalysts. In one instance, the catalysts used are metal particles, such as iron micro or nanoparticles. The first reactor and the last reactor can be subjected to a rapidly changing magnetic field produced by a magnetic system. The magnetic field can be generated by applying an electric current through metal coils attached to the first and the last reactors. For example, an ac current is passing through the coil to generate a rapidly changing field. The application of the magnetic field can result in the rapid movement of the iron particles, which has led to an enhanced fluidization quality. The strength of the magnetic field is sufficient to allow the particles in reactors to achieve a fluidization state.

In another aspect, the present invention provides multilayer reaction apparatus for continuous production of carbon nanotubes. The apparatus includes a catalyst activation reactor (211, 212, 213, 214 or 215) having an activation feed inlet (221, 222, 223, 224 or 225) and a catalyst gas outlet (220, 226, 227, 228 or 229); and a fluidized-bed reactor (231, 232, 233, 234 or 235) having a plurality of zones comprising a first reaction zone (251, 252, 253, 254 or 255), a second reaction zone (261, 262, 376, 364 or 265), a third reaction zone (263), . . . an (m-1) reaction zone, and an mth reaction zone (i.e. a last reaction zone). m is an integer of at least 2. In one embodiment, the reaction zones are continuous and separated by (m-1) plate distributors (266, 267, 268, 269, 256 and 257). The apparatus also includes a gas distributor (258, 259, 236, 237 or 238); at least one plate distributor mounted within the fluidized-bed reactor for separating the plurality of zones; a main feed inlet mounted on the fluidized-bed reactor; an exhaust gas outlet (281, 282, 283, 284 or 285) mounted on the fluidized-bed reactor and is optionally coupled to a gas-solid separator; a product outlet (271, 272, 273, 274 or 275) mounted on the fluidized-bed reactor and is optionally coupled to a gas-solid separator. The catalyst activation reactor is attached to the fluidized-bed reactor. The catalyst gas outlet is optionally connected to the main feed inlet, for example, through a circulating tube (201, 202, 203, 204 or 205). The first reaction zone is next to the main feed inlet and the last zone is next to the exhaust gas outlet, which is optionally coupled to a gas-solid separator. In one instance, the multilayer reaction apparatus is oriented vertically (i.e. a vertical reactor), wherein the main feed inlet is attached to the bottom of the reactor and the exhaust gas outlet is attached to the top of the reactor. In another instance, the first reaction zone and the last reaction zone are connected via a circulating tube. The circulating tube can locate outside the reactor (FIG. 2D) or within the reactor (FIG. 2E).

Since each of the reaction zones contains materials having different densities and the density gradients have been established within one reactor, the feed gas flow approaches plug flow, which has the advantages of avoiding the low conversion due to all mixing, return mixing and back-mixing processes.

In one embodiment, the multilayer reactor further includes a circulating tube having two open ends, wherein one end of the circulating tube is connected to the first reaction zone and the other end is connected to the last reaction zone of the fluidized-bed reactor. The circulating tubes can have various shapes and sizes, for example, the tube can be a spiral tube or an inner cyclone tube or an outer cyclone tube.

In one embodiment, the multilayer fluidized-bed reactor has a uniformed dimension. For example, the fluidized-bed reactor can have a cylindrical shape, step-shape or cone shape. The reactor can be oriented vertically or horizontally. In some embodiments, the cross-sections of the reactor can be circular, oval, square, rectangular, or polygonal. The reactor can have from 1 mm to about 5 cm in wall thickness. In another embodiment, each of reaction zones has a different dimension. In one instance, the dimension gradually increases. For example, the dimension of each of the reaction zones increases from the first reaction zone to the last reaction zone. In another instance, the dimension of each of the reaction zones decreases from the first reaction zone to the last reaction zone. In yet another instance, the dimension of the reaction zones increases or decreases stepwise.

The catalyst activation reactor can be attached at various locations on the main fluidized-ed reactor. Typically, the catalyst activation reactor is attached to the main fluidized-bed reactor through a conduit, such as a circulating tube, such that the activated catalysts can be continuously fed into the reaction zones. In one embodiment, the catalyst activation reactor is attached to the first reaction zone of the fluidized-bed reactor. In another embodiment, the catalyst activation reactor is attached to the last reaction zone of the fluidized-bed reactor. In yet another embodiment, the catalyst activation reactor can be attached to a predetermined reaction zone. In one embodiment, the catalyst activation reactor is connected to the main reactor through a circulating tube.

The gas distributor can be a plate, a tubular or a pipe. Typically, the gas distributor is located near the reaction feed inlet. For instance, the gas distributor is located near the bottom of the reactor when the reactor is in an upright position. The plate distributors mounted inside the reactor have a plurality of openings with dimensions sufficient to allow the passage of nanotubes agglomerates at different growth stages, and to provide fluidization for carbon nanotubes agglomerates present in each of the reaction zones. The openings can be either evenly distributed or randomly distributed. In one embodiment, the upper plate distributors have larger openings than the lower plate distributors. In another embodiment, the upper plate distributors have smaller openings than the lower plate distributors. The opening ratio for the plate distributors is defined as the total opening area on the plate distributor divided by the total area of the plate distributor. A multilayer reactor has at least one plate distributor and one gas distributor.

In one embodiment, a multilayer fluidization reactor has one or more plate distributors mounted within the reactors along the reaction pathway to establish reaction zones having various solid/gas densities. The reaction pathway comprises a plurality of reaction zones, wherein the nanotubes agglomerates are reacted with the feed gas in a first zone to grow in volume and expand into the subsequent reaction zones to form the desired nanotube products in the last reaction zone. For instance, the reactor can be in an upright position, where the reaction zones are separated by the plate distributors into different regions to establish a density gradient for the solid material. In one embodiment, a series of multilayer reactors can also be combined or joined together to form a multistage reaction apparatus. The plate distributor typically has a plurality of openings of various sizes and dimensions. The distribution of the solid material within each zone can be controlled by adjusting the opening ratio of each distributor, the dimension or size of the openings and the relative height of each reaction zone to establish a concentration density gradient for both the solid material and feed gas. The conversion of the feed gas can be increased drastically by the use of such a design. Alternatively, the carbon nanotubes agglomerates are reacted with the feed gas in a last reaction zone to grow in volume and expand into the subsequent reaction zones to form the desired nanotube products in the first reaction zone.

The distributors can have various forms. The gas distributor next to the feed gas inlet for the reactor can be either a plate or a tubular type. The plate distributors are generally a plate type. In one embodiment, the lower plate distributor has an opening ratio from about 0.001 to about 10%, or in certain instances, from about 0.01 to about 5%. In one embodiment, the openings have a dimension from about 0.1 to about 5 mm, for example, from about 0.2 to about 3 mm. In one embodiment, the upper distributing plates have an opening ratio from about 2% to about 90%, such as 5-50%. In certain instances, the opening ratio is selected from about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 42, 42, 43, 44, 45, 46, 47, 48, 49, 50, 51, 52, 53, 54, 55, 56, 57, 58, 59 or 60%. The openings on the distributors have a dimension from about 0.1-60 mm, such as from about 3-30 mm. In certain instances, the openings on the distributors have a dimension selected from about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 42, 42, 43, 44, 45, 46, 47, 48, 49, 50, 51, 52, 53, 54, 55, 56, 57, 58, 59 or 60 mm. In some embodiments, the distribution of the materials among different layers or zones and stabilities can be precisely controlled by using a circulating tube that connects the upper zone and the lower zone within the reactor. The circulating tubes can be mounted outside the reactor or inside the reactor. In certain instances, the upright reactor can be tilted to an angle from the upright position, such as a 45 or 90 degree. For example, the reactor can be positioned at any angle from about 1° to about 90° relative to the upright position. In certain other instances, the material dwelling time within each reaction zone and the reaction extent can be controlled by adjusting the height of the reaction zone and the type of the circulating tubes used, for example, using a cyclone type of circulating tube (see, FIGS. 2D and 2E).

Figure 2B:
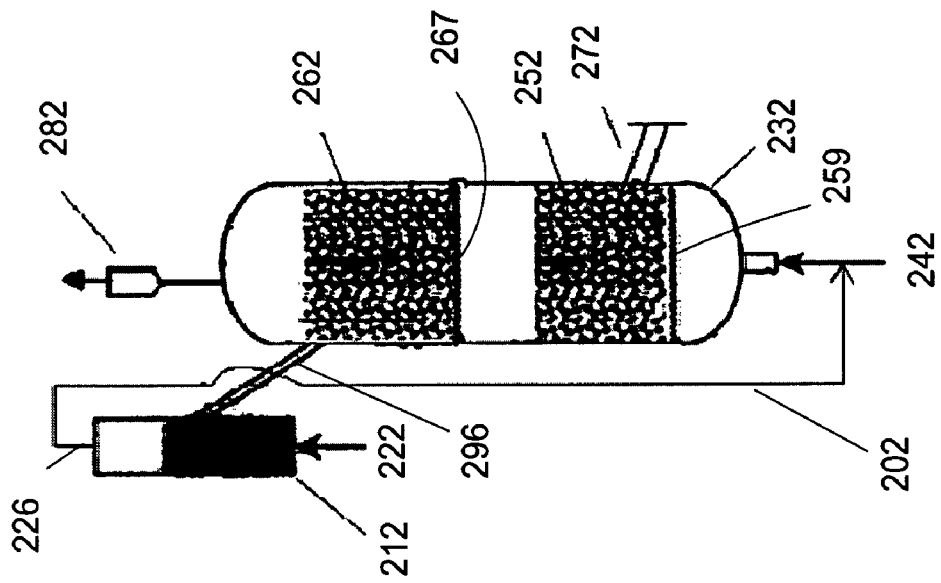

In one embodiment, the catalyst activation reactor can be connected to the second reaction zone of the fluidized-bed reactor (see, FIG. 2B). In this manner, the freshly activated catalysts is added into the second reaction zone and reacted for a while before entering into the first reaction zone. Similarly, the material flux within the reactor can be controlled by adjusting the opening ratio of the distributor plates, the dimension of the openings and operation gas flow rate or space velocity of the gas. The materials are allowed to continue reacting at the lower first reaction zone and the products are collect from product outlet 272. Without being bound by any theory, since the solid materials and the incoming feed gas move in opposite directions, which results in adverse flow contact, a feed gas conversion of about 95% can be obtained. Using a multilayer reactor as shown in FIG. 2C, the conversion can reach 100%. Since the upper zone of the reactor has smaller diameter, this reactor also has the advantage of low cost of manufacturing, and high space velocity of facilitating the fluidization of freshly added catalysts.

Figure 2A:
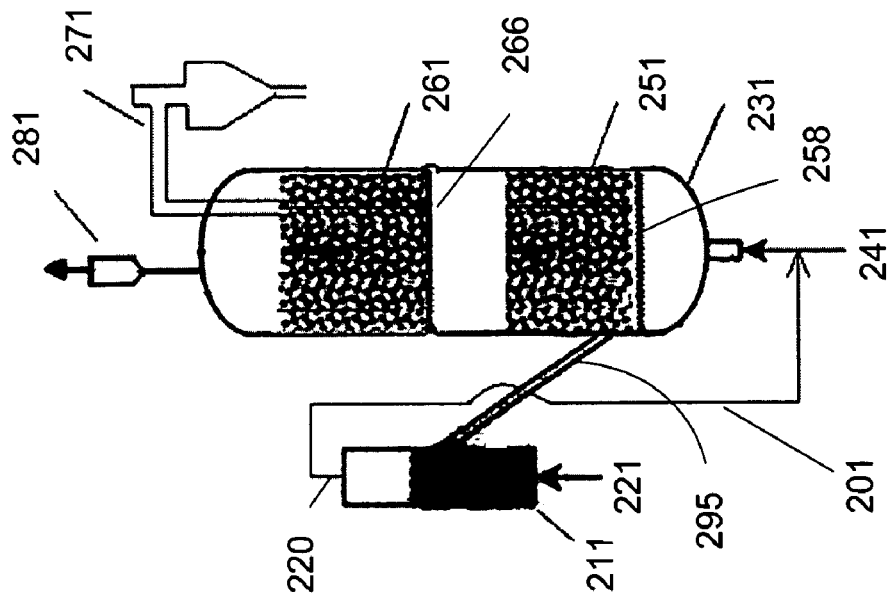
Figure 2E:
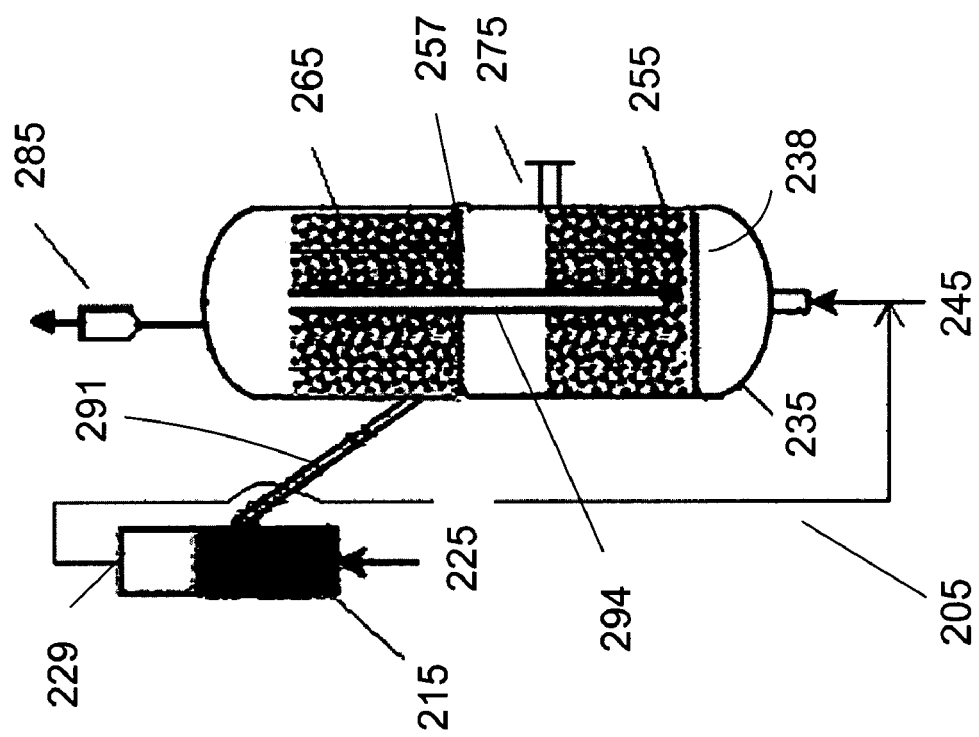

FIG. 2A shows a multilayer reaction apparatus according to an embodiment of the present invention. The multilayer apparatus has a lower reaction zone (first reaction zone) 251 and an upper reaction zone (second or last reaction zone) 261. A catalyst activation reactor 211 has an activation feed inlet 221 and catalyst gas outlet 220. The catalyst activation reactor is attached to the lower reaction zone (first reaction zone) 251. The catalyst activation reactor 211 is connected to the main fluidization reactor 231 through a connecting means 295. The connecting means 295 can be any device such as a pipe or a tube for adding activated catalyst to the main reactor. Optionally, the catalyst gas outlet 220 is connected to the main feed inlet 241 through a conduit 201. The main reactor 231 can have two or more reaction zones. In FIG. 2A, gas distributor 258 and plate distributor 266 separate the reactor into two reaction zones 251 and 261. Gas distributor 258 is designed such that only gas is passing through from gas inlet 241. Plate distributor is designed, such that low-density nanotube agglomerates can pass through and achieve a suitable fluidization condition. Exhaust gas outlet 281 is optionally coupled to a gas-solid separator and mounted on reactor 231. A product outlet 271 is optionally coupled to a gas-solid separator and mounted on reactor 231.

FIG. 2B shows a multilayer reaction apparatus according to another embodiment of the present invention. Similar to the apparatus shown in FIG. 2A, the multilayer reactor also has catalyst activation reactor 212 connected to a main reactor 232. The main reactor 232 also has at least two reaction zones 252 and 262, a feed inlet 242, an exhaust gas outlet 282 and a product out let 272. However, the catalyst activation reactor is attached to the upper reaction zone (last reaction zone) 252. The catalyst gas outlet 226 is optionally connected to the main feed inlet 242 through a conduit 202.

FIG. 2C shows a multilayer reaction apparatus according to yet another embodiment of the present invention. The main fluidized-bed reactor 233 has three reaction zones, a first reaction zone 253, a second reaction zone 276 and a third reaction zone (last reaction zone) 263. The diameters of the reaction zones decrease from the first reaction zone to the last reaction zone. Alternatively, the diameters of the reaction zones can increase from the first reaction zone to the last reaction zone. The main reactor 233 has a gas distributor 236, and plate distributors 268 and 269, where the plate distributors have a plurality of openings or holes. The fluidization first started in reaction zone 263. As the catalysts are reacted with the feed carbon gas from feed inlet 243 in a reverse contact manner, the product nanotubes start to grow. The nanotubes agglomerates in reaction zone 263 expand through plate distributor 268 into the second reaction zone 276. The nanotubes agglomerates continue to grow in volume and expand through plate distributor 269 into the first reaction zone 253. The product can be collected from the product outlet 273. The space velocity, superficial velocity, plate distributor openings and opening ratios can be controlled to achieve an optimized conversion.

FIG. 2D shows a multilayer reaction apparatus according to yet another embodiment of the present invention. The catalyst activation reactor 214 and the main reactor 237 are similar to those in FIG. 2B. A circulating tube 292 is attached to the outside of the main reactor 237. The circulating tube 292 has two open ends. One end of the circulating tube is connected to the first zone 254 and the other end is connected to the second zone 264 to allow the control of stability of the reactor. The circulation tube can adopt various shapes and sizes.

FIG. 2E shows a multilayer reaction apparatus according to a further embodiment of the invention. The catalyst activation reactor 215 and the main reactor 238 are similar to those in FIG. 2B. A circulating tube 294 having two open ends is resided inside the main reactor 238. One end of the circulating tube is in gas/solid communication with the first zone 255 and the other end is connected to the second zone 265 to allow the control of stability of the reactor. The circulation tube can adopt various shapes and sizes.

Figure 3A:
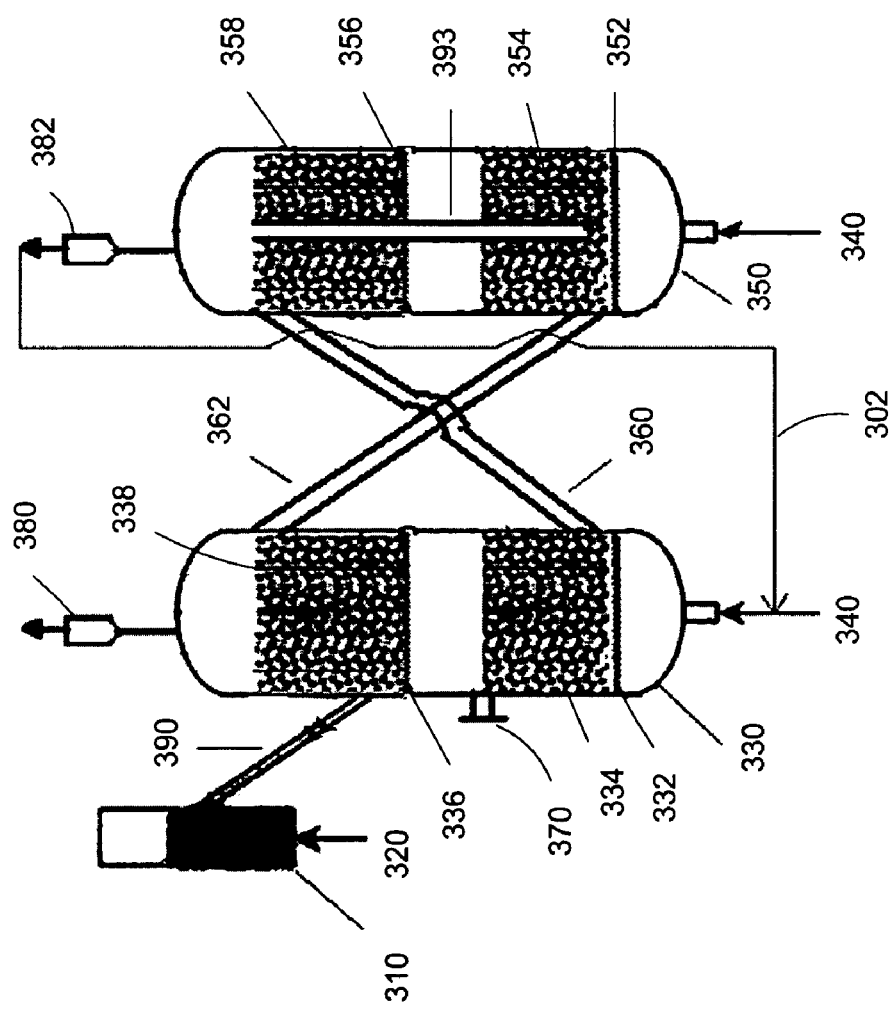
FIGS. 3A-3B illustrate another type of multistage reactors according to an embodiment of the invention. The reactors include combinations of two or more multilayer reactors.

FIG. 3A shows a multistage reactor according to an embodiment of the present invention. Fluidized-bed reactors 330 and 350 are connected through circulating tubes 360 and 362. The reactor 330 has a feed inlet 340, exhaust gas outlet 380 and product outlet 370. The reactor 350 has a feed inlet 340 and an exhaust gas outlet 382. The reactors also have gas distributors 332 and 352 and plate distributors 336 and 356. Reactor 350 has a circulating tube 393 connecting to the upper (second) reaction zone 358 and the lower (first) reaction zone 354. The catalysts are added to the upper reaction zone 338 of the reactor 330. Some of the nanotube agglomerates formed are transported through circulating tube 362 into the first reaction zone 354 of the reactor 350. Other nanotube agglomerates expand and pass through a plate distributor 336 into the lower reaction zone 334 of the reactor 330. The nanotube agglomerates in zone 334 continue reacting with the feed gas of reactor 330. The nanotubes agglomerates in the zone 354 also continue reacting with the feed gas, growing in volume, passing through the plate distributor 356 and expanding into the upper zone 358 of the reactor 350. The resulting nanotube agglomerates in zone 358 are further transported into the first zone 334 of reactor 330. The carbon nanotube products are then collected from outlet 370. The conversion is nearly quantitative.

Figure 3B:
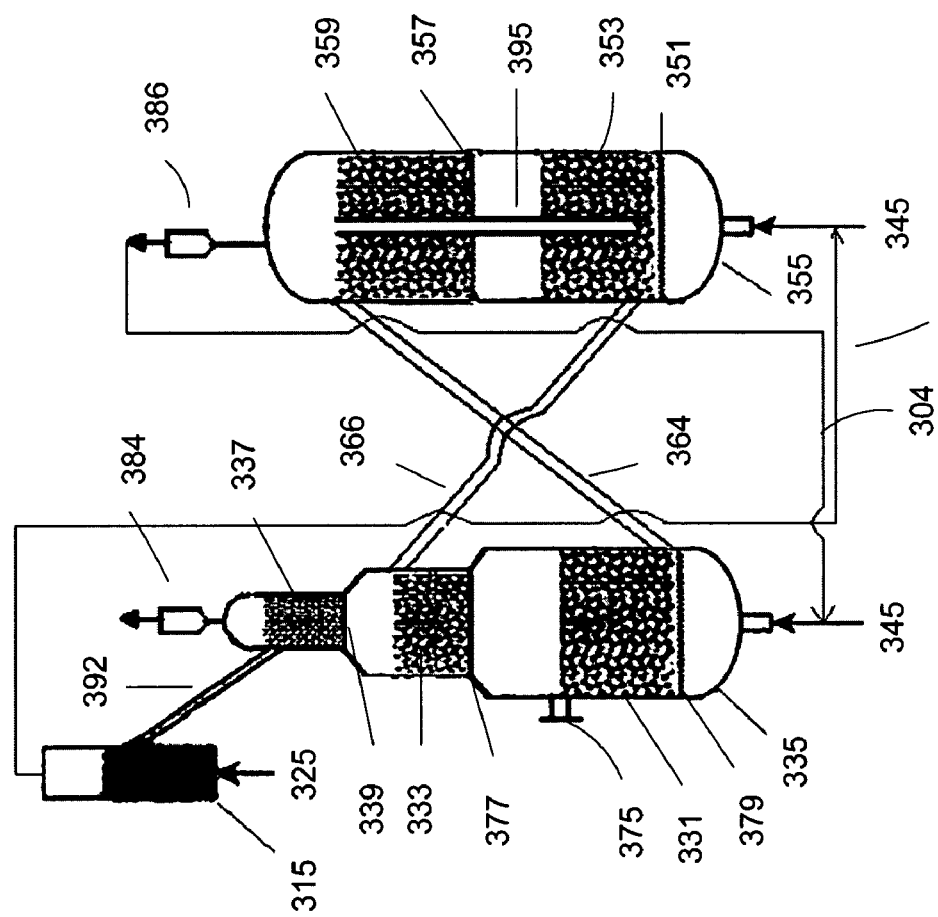

FIG. 3B illustrates another multistage reactor according to an embodiment of the present invention. The first reactor 335 has three reaction zones 331, 333, 337. The reaction zones 331, 333, 337 can be positioned along the vertical (or gravitation) direction with the lower reaction zones having increase volumes as shown in FIG. 3B. Similar to the apparatus in FIG. 3A, the catalyst activation reactor is attached to the upper (third) zone 337 of reactor 335. Activated catalysts are added into reaction zone 337 and reacted with the carbon feed gas to form nanotube agglomerates, which expand in volume and pass through plate distributor 339 into the reaction zone 333. Some nanotubes agglomerates go through circulating tube (or transporting tube) 336 into reaction zone 353 of reaction 355. The nanotubes agglomerates continue reacting and growing in reactors 337 and 353. The nanotubes agglomerates in reaction zone 333 further expand in volume and pass through plate distributor 377 into reaction zone 331. The nanotubes agglomerates in reaction zone 353 of reactor 355 are also further reacted with the feed gas, undergo volume expansion and pass through plate distributor 357 into reaction zone 359. The nanotubes agglomerates in the reaction zone 359 further react and expand in volume and are transported into reaction zone 331 via circulating tube 364. The nanotubes agglomerates in reaction zone 331 continue reacting with the feed gas to form the desired carbon nanotubes products. The carbon nanotubes products are collected from product outlet 375. Surprisingly, a high yield and a quantitative conversion are achieved.

In yet another aspect, the present invention provides an apparatus for continuous production of carbon nanotubes. The reactor includes a catalyst storage reactor (410 or 415) having a feed gas inlet (450 or 455) and an catalyst gas outlet (462 or 465) mounted on the catalyst storage reactor; a main fluidized-bed reactor (420 or 425) having a main feed-gas inlet (480 or 485), a main exhaust gas outlet (460 or 463) and a product outlet (490 or 495). The product out let (490 or 495) is further connected to a gas-solid separator (440 or 445). The catalyst storage reactor and the main fluidized-bed reactor are connected by a riser (430 or 435) having two open ends, wherein one open end is attached to the catalyst storage reactor and the other open end is attached to the main fluidized-bed reactor. Optionally, the riser is connected to the main fluidized-bed reactor through a gas-solid separator (442).

Figure 4B:
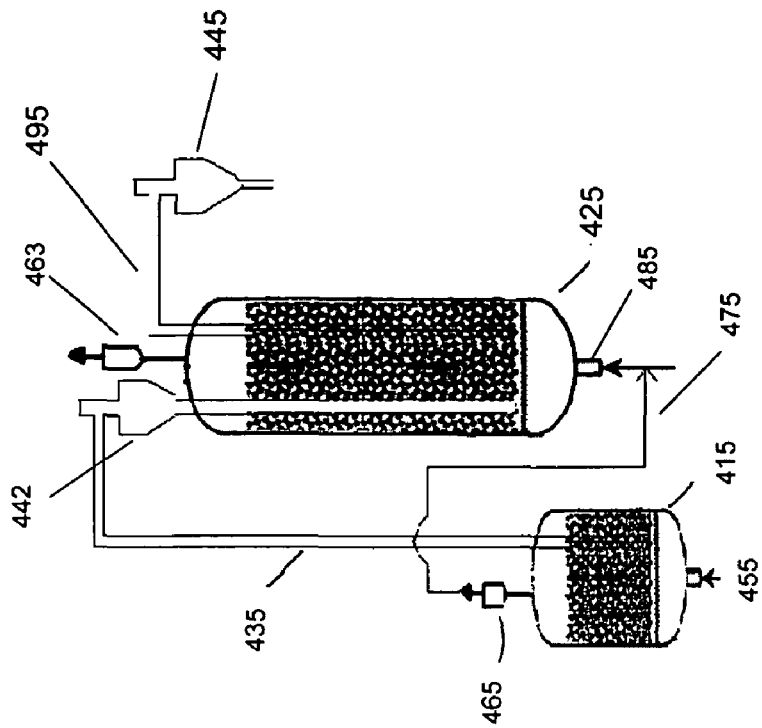
FIGS. 4A and 4B illustrate a type of reactors having a combination of a riser and a fluidized-bed.
Figure 4A:
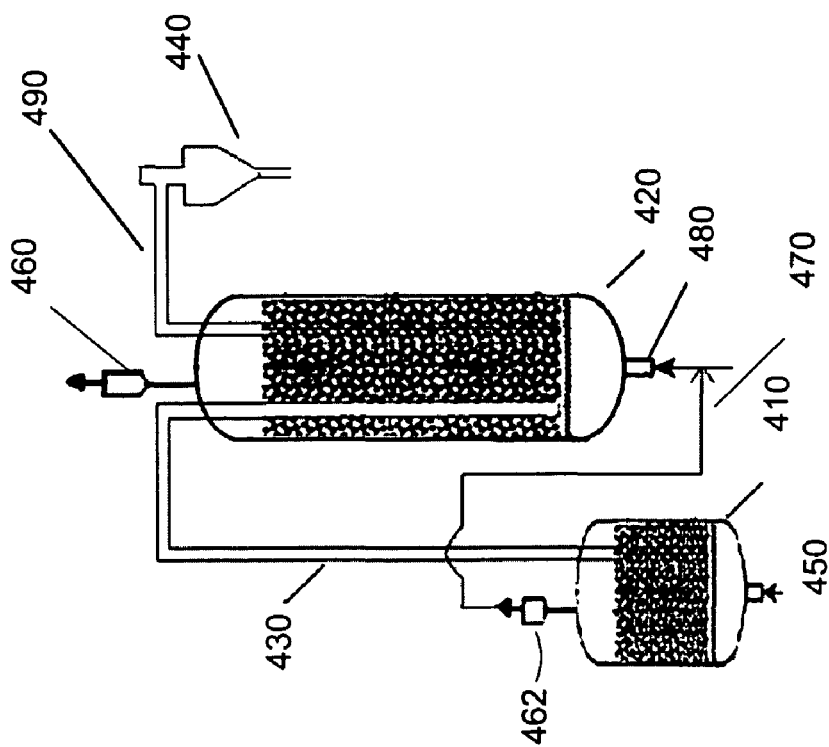

FIGS. 4A and 4B show a combination of fluidized reactors including a rising tube (riser) or a lifting tube. The riser can be a straight or spiral tube. As shown in FIG. 4A, storage tank 410 has an activation gas inlet 450 and a catalyst gas outlet 462. The outlet of the storage tank is optionally attached to the gas inlet of fluidized-bed reactor 420. One end of riser 430 is connected to storage tank 410 and the other end is connected to reactor 420. Gas-solid separator 440 can be attached to reactor 420. In FIG. 4B, a gas-solid separator 442 is attached to riser 435. In general, the gas flow rate in the riser is from about 0.1 to about 30 m/s, such as 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 m/s. In one embodiment, the gas flow rate is from about 0.5 to about 30 m/s. Typically, the riser 430 or 435 contains from about 1 to about 50% solid material. The catalysts can spend a few milliseconds to about a few seconds in the riser depending on the design of riser and gas flow rate. As such, the catalyst reaction time can be precisely controlled by adjusting and designing the length of the tubes and gas flow rate. Since the gas flow in the riser nearly approaches plug flow with minimal returns and mixings, the side reactions between the fresh added catalysts and the hydrogen can be minimized and controlled. As such, the reaction condition facilitates the nucleation and formation of single-wall and double-wall carbon nanotubes. If necessary, the riser can also function as a continuous feeding pipeline instead of a reactor. This also facilitates the growth of single-wall and multi-wall carbon nanotubes. The continuous feed equipment can be a Venturi tube type of riser or a screw feeder. Depending on the size of the reactors, risers of various dimensions can be used. The inner diameter of the risers can be from about 2 mm to about 20 cm. In one embodiment, the inner diameter of the risers can be from about 5 mm to about 100 mm. The length of the risers can be from about 20 cm to about 200 meters to achieve the desired gas flow rates and/or catalyst dwelling time in the risers. In one embodiment, the risers are about 20 cm to about 2 meters long. For space saving purpose, the riser can be coiled into a helical shape.

In a further aspect, the present invention provides a multistage reaction apparatus for continuous production of carbon nanotubes. The apparatus includes a catalyst activation reactor having an activation feed inlet (570 or 575) and a catalyst gas outlet (590 or 595), a outer reactor (510 or 515) having a first gas inlet (542, 540, 545 or 547) mounted on the outer reactor, an inner reactor (520) mounted within the circular outer reactor, wherein the inner reactor has a second gas inlet (530 or 535), a heating device (550 or 555) surrounded the outer reactor; an exhaust gas outlet (560 or 565) coupled to a gas-solid separator (562 or 563) attached to the outer reactor, and wherein the catalyst activation reactor is mounted on the outer reactor. In one embodiment, the activation feed inlet of the catalyst activation reactor is coupled to the inner reactor and the exhaust gas outlet is coupled to the outer reactor. In another embodiment, the activation feed inlet of the catalyst activation reactor is coupled to the outer reactor and the exhaust gas outlet is coupled to the inner reactor.

Figure 5A:
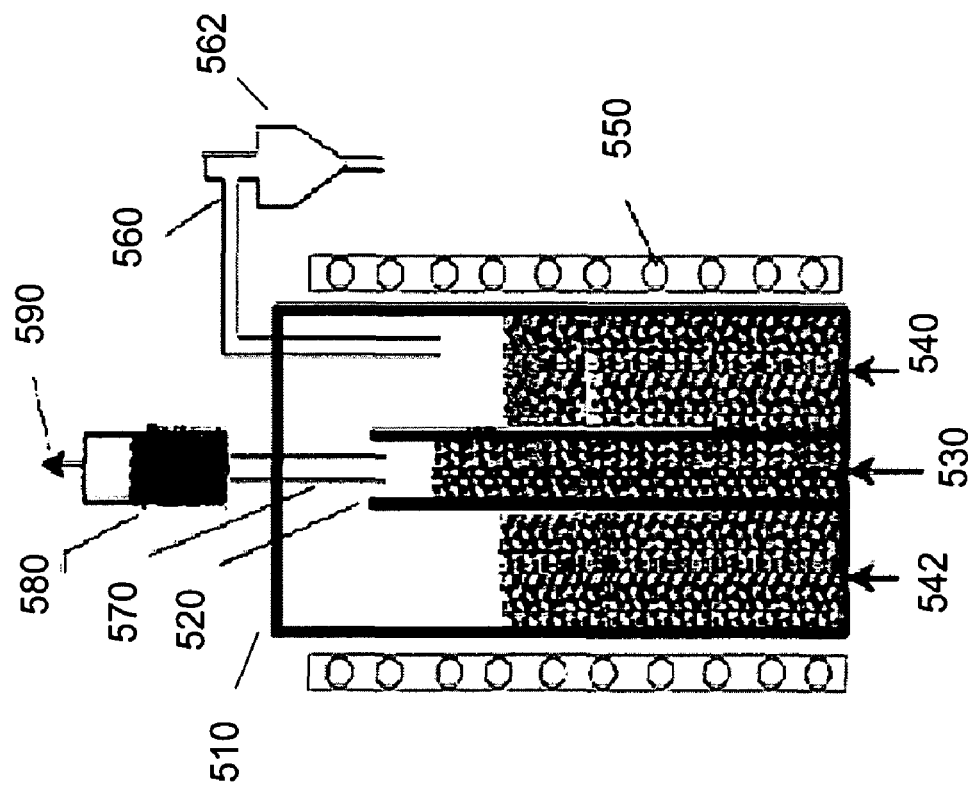
FIGS. 5A and 5B illustrate nesting parallel ring-like reaction apparatus that include internal and outer reactors.

FIG. 5A illustrates a ring-like reactor according to an embodiment of the present invention. A circular inner reactor 520 is embedded in an external or an outer reactor 510. The outer reactor 510 has outer reactor feed inlets (first feed inlets) 540 and 542 and an exhaust gas outlet 560 coupled to a gas-solid separator 562, where the inlets and outlets are mounted on the outer reactor. The inner reactor 520 has a second gas inlet 530 mounted on the inner reactor. For example, the inlet 530 can mounted on one end of the inner reactor. The other end of the inner reactor is coupled to the activation feed inlet 570 of the catalyst activation reactor 580. The heating device 550 is either in direct or indirect contact with the outer reactor 510. The heater or heating device can be a heating mantel or a heating jacket. The exhaust gas can be released from the exhaust gas outlet 560, which is optionally coupled to a gas-solid separator 562.

Figure 5B:
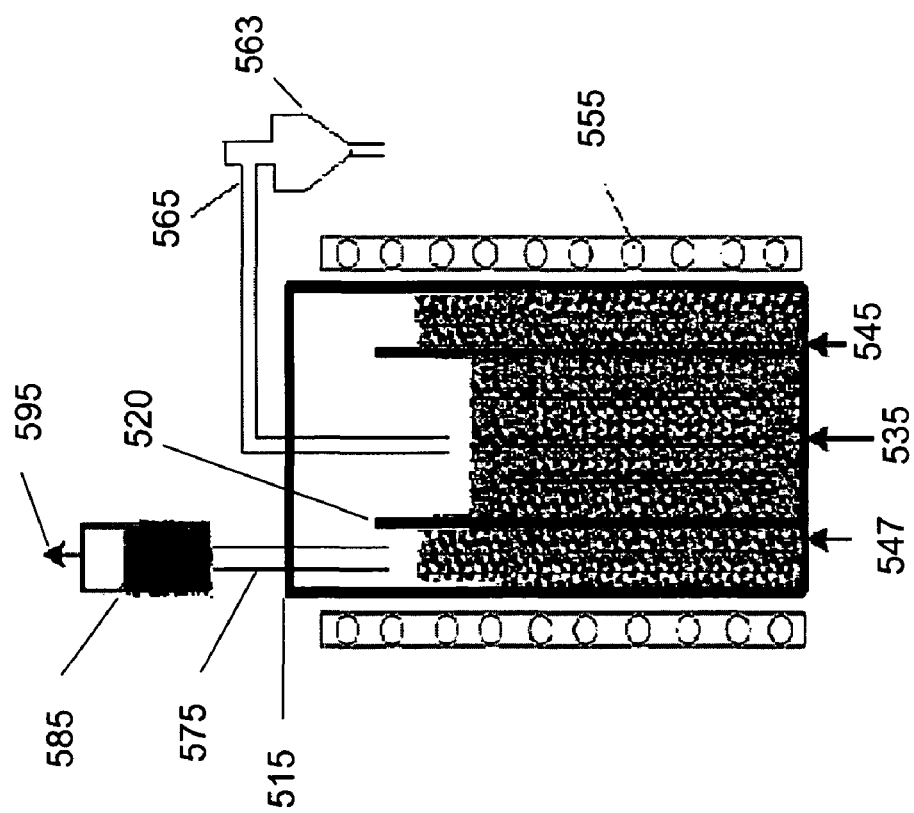

FIG. 5B illustrates another embodiment of the invention. A circular inner reactor 520 is embedded in a circular outer reactor 515. The outer reactor 515 has outer reactor feed inlets (first feed inlets) 545 and 547 and an exhaust gas outlet 565 coupled to a gas-solid separator 563, where the inlets and outlets are mounted on the outer reactor. The inner reactor 520 has a second gas inlet 535 mounted on the inner reactor. For example, the inlet 535 can mounted on one end of the inner reactor. The other end of the inner reactor is coupled to the exhaust gas outlet 565. The activation feed inlet 575 of the catalyst activation reactor 585 is coupled to the exterior rector. The heating device 555 is either in direct or indirect contact with the outer reactor 515. Similarly, the heater can be a heating mantel or heating jacket. The exhaust gas is can be released from exhaust gas outlet 565, which is optionally coupled to a gas-solid separator 563.

In still another aspect, the present invention provides a multistage reaction apparatus for continuous production of carbon nanotubes. The apparatus includes a catalyst activation reactor 680 having an activation feed inlet 670 and a catalyst gas outlet 690; a main feed gas inlet 660; a main reactor 600 having a plurality of reaction zones; a stirring device 620 mounted on the reactor, wherein the stirring device comprises a stirring rod 625, a plurality of stirring blades 630 and a movable gas seal 610; a gas-solid separator attached to the main reactor and a product outlet mounted on the main reactor. The plurality of reaction zones includes a first reaction zone, a second reaction zone, a third reaction zone, . . . an mth reaction zone (i.e. a last reaction zone), wherein m is an integer of at least 2, such as from 2-1000. The main feed gas inlet and catalyst activation reactor can be connected to any suitable reaction zone of the main reactor. The connection of the catalyst activation reactor and the main reactor is through the activation feed inlet of the catalyst activation reactor. In one embodiment, the main feed gas inlet is attached to a first reaction zone and the activation feed inlet is connected to a first or a last reaction zone of the reactor. In another embodiment, the multistage reactor is a step-shape reactor. Each of the plurality of reaction zones has a diameter, the diameter increases from the first reaction zone to the last reaction zone. In yet another embodiment, each of the reaction zones has a uniformed diameter. In one embodiment, the apparatus is a vertical reactor, wherein the main reactor is oriented vertically. In another embodiment, the apparatus is a horizontal reactor, where the main reactor is oriented horizontally. In one instance of a horizontal reactor, the activation feed inlet of the catalyst activation reactor is connected to the first reaction zone of the main reactor. In another instance of a horizontal reactor, the activation feed inlet of the catalyst activation reactor is connected to the last reaction zone of the main reactor.

Figure 6:
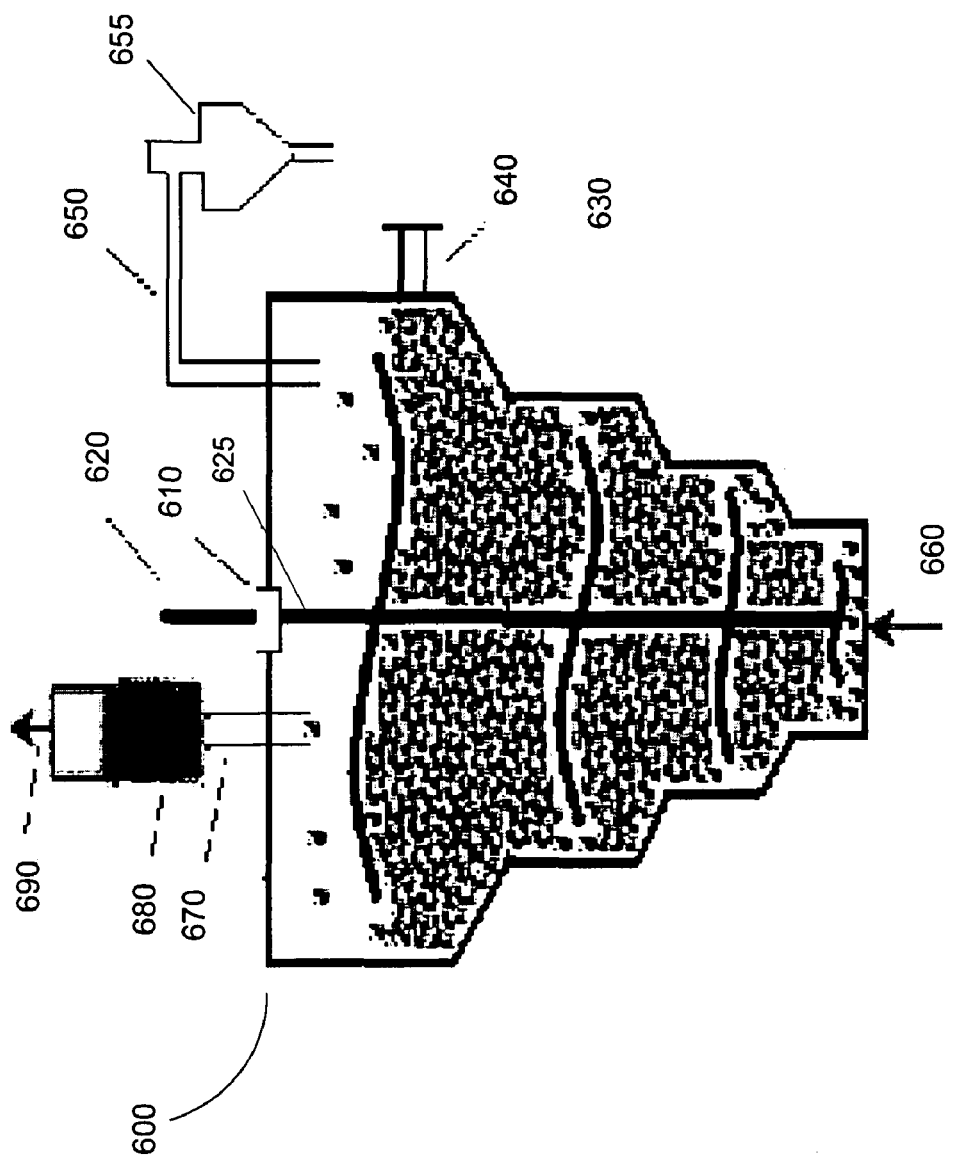
FIG. 6 illustrates a multistage step-shape reactor having a stirring device.

FIG. 6 illustrates a step-shape multistage reactor. Alternatively, the reactor can have a cone-shape. The step-shape reactor has several advantages. It is low cost, convenient to manufacture and extremely suitable for the production of carbon nanotubes. As shown in FIG. 6, the step-shape fluidized-bed reactor has a movable seal 610, stirring device 620, a plurality of stir paddles or blades 630 attached to the stirring rod 625, product outlet 640, main exhausted gas outlet 650, gas-solid separator 655, main feed gas inlet 660, catalyst activation reactor 680 having an activation feed inlet 670, and a catalyst gas outlet 690.

The catalysts can be added to the first zone, or the lowest zone of the fluidized-bed reactor. As the reaction proceeds, the catalysts and the carbon nanotubes form nanotubes agglomerates and gradually expand in volume and enter into the second zone of the reactor. The agglomerates continue expanding until they enter the last zone of the reactor. Due to the high density and high activity, the freshly added catalysts deposit mostly in the first zone of the reactor. As the reaction progresses, the catalysts become less dense and gradually deactivated and distribute mostly in the later zones of the reactor. To control the gas velocity and density of the material, the volume expansion, the diameters of the different reaction zones increase gradually. The extent of diameter increases for different reaction zones from the first zone to the last zone can be a factor of 1.5 to 5, such as 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0. The superficial velocity can also gradually reduce accordingly since the gas dwelling time has increased at each of the subsequent reaction zones. This type of step-shape reactor structure allows a good match between the catalyst distribution and feed gas superficial velocity. The use of step-shape reactor design also allows the enhancement of catalysts activity and a better conversion of feed gas. The stirring device in the reactor can further provide improvement to the fluidization of the solid materials. The stirring device can be a mechanical stirrer or a magnetic field. For example, the solids can be in a complete fluidization condition or half fluidization condition, such as a wriggle state. Because the stirring device has assisted the fluidization, the step-shape multistage reactor with a stirring device has the advantage of capable of operating at a low superficial gas velocity, which has resulted in an increased dwelling time for the feed gas. Thus, conversion for the feed gas can be enhanced significantly.

In another aspect, the present invention provides horizontally oriented multistage reactors. FIG. 7 shows some embodiments of horizontal moving-bed reactors. Change of a vertical reactor to a horizontal reactor has the advantage of eliminating the height limitation during installation. The horizontal reactors also have the advantage of easy manufacturing compared to the vertical reactors. In addition, the horizontal reactors do not require the use of reaction vessels of different diameters. Moreover, the horizontal reactors are very valuable for large-scale productions. Since the solid materials in the reactors move horizontally, return mixing, back-mixings and/or entire mixing do not occur notably. The dwelling time of the solid materials is similar at different reaction zones, which allows the achievement of product quality control.

The horizontal stirring propeller type moving bed reactor is extremely similar to the rotary kiln, but the former depends upon the propeller rotation to cause the solid material to continuously moving and transporting to the front. The revolving part only involves propellers. The reactor is fixed. In comparison, the rotary kiln type reactor requires complex power system.

Figure 7A:
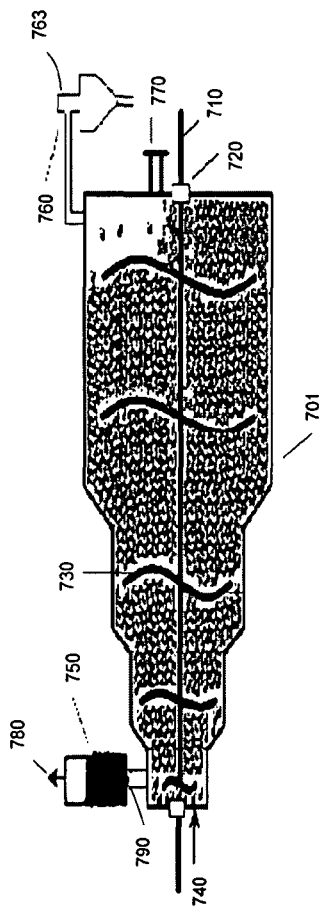
FIGS. 7A-7C illustrate horizontal moving-bed reactors having a propeller type of stirring device.

FIG. 7A shows a horizontal step-shape reaction apparatus with a combination of reaction zones of increasing diameters. The apparatus has a main reactor 701 and a catalyst activation reactor 750. The main reactor has an inlet 740, an exhaust outlet 760 attached to the main reactor and coupled to a gas-solid separator 763, a product outlet 770, a stirring device 710, and a movable seal 720 and a plurality of stirring blades or propellers 730. As shown in FIG. 7A, the reactor 701 has a plurality of reaction zones of varying diameters. The reaction zones can have increased diameters along the direction from feed inlet to product outlet.

Figure 7B:
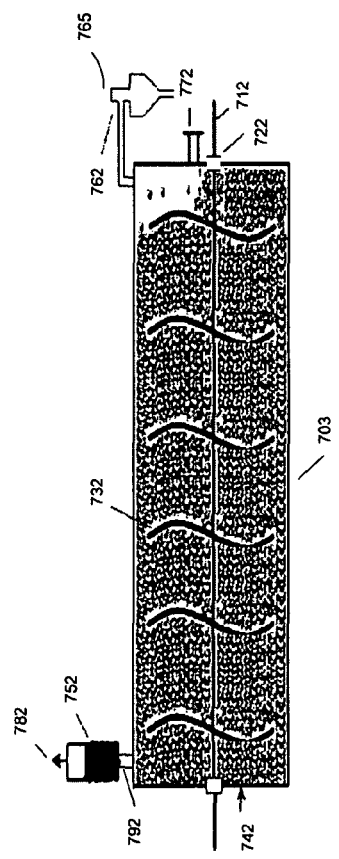

The reactor can also have a plurality of reaction zones of the same diameter having the same or different length (see, FIG. 7B). The apparatus has a main reactor 703 and a catalyst activation reactor 752. The main reactor 703 has an inlet 742, an exhaust outlet 762 attached to the main reactor and coupled to a gas-solid separator 765, a product outlet 772, a stirring device 712, a movable seal 722, and a plurality of stirring blades or a propeller 732.

Figure 7C:
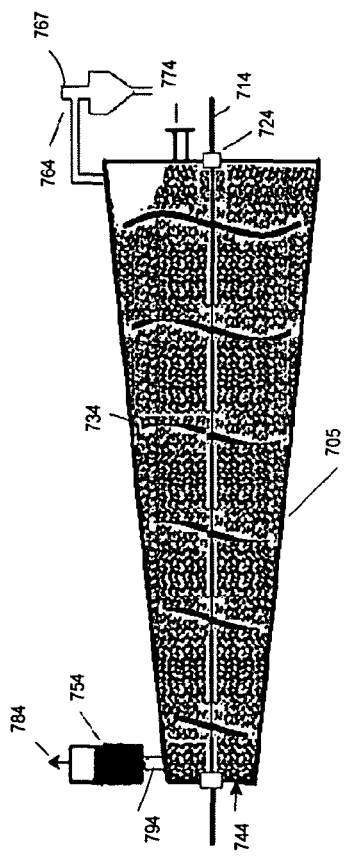

FIG. 7C shows another embodiment of the present invention. The multistage reactor has a cone-shape with a gradual increase of dimension in the direction from feed inlet 744 to product outlet 774. The apparatus has a main reactor 705 and a catalyst activation reactor 754. The main reactor 705 has an inlet 744, an exhaust outlet 742 attached to the main reactor and coupled to a gas-solid separator 767, a product outlet 774, a stirring device 714, a movable seal 724 and a plurality of stirring blades or propeller 734.

In another aspect, the present invention provides a method for continuously preparing carbon nanotubes. The method includes providing a multistage or multilayer reaction apparatus and administering a feed gas, an activated catalyst and an inert gas under conditions sufficient to prepare the carbon nanotubes.

In one embodiment, the method for continuously preparing carbon nanotubes includes five steps. The inactive catalysts are first activated by reacting with a reducing gas at an elevated temperature. For example, the inactive catalysts together with the solid supports are placed in a catalyst activation apparatus at a temperature from about 350-900° C. and a reducing gas is passed through the inactive catalysts to convert the catalysts into active metal nanoparticles. The inactive catalysts useful for growing carbon nanotubes include, but are not limited to, metal complexes, metal salts and metal oxides. The reducing gas can be a mixture of hydrogen and nitrogen or a mixture of carbon monoxide and nitrogen. In one instance, the ratio of hydrogen to nitrogen or carbon monoxide to nitrogen can be from about 1:0.1 to 10:1. The reaction time varies from about 0.1 to about 3 hours. Second, the temperature of the first fluidized-bed reactor is increased to about 500° C.-900° C. and the activated catalysts are transported to the first fluidized-bed reactor from the catalyst activation reactor. A carbon feed gas or liquid together with a mixture of hydrogen and nitrogen are passed through the first fluidized bed reactor to react with the catalyst to form carbon nanotubes. The carbon feed gas includes, but is not limited to, CO, $C_{1-6}$ hydrocarbon gas, liquefied hydrocarbon gas, natural gas, benzene, toluene, dimethylbenzene, cyclohexanes or a combination thereof. The volume ratio for the hydrogen gas, the carbon feed gas, and the nitrogen gas is from about (0~2):1:(0~0.5). The space velocity is from about 1~10,000 $hr^{-1}$ and the superficial velocity is about 0.03~5 m/s. Third, as the reaction progresses, the carbon nanotubes formed expand and gradually increase in volume to occupy most part of the first reactor. At this point, the gas flow rate can be increased to drive the raw nanotube products from the first reactor into the second reactor. The raw nanotube products continue to react with the feed gas in the second reactor. Alternatively, the gas flow rate is maintained and the raw nanotube products continue to react in the first reactor. On the other hand, the exhaust gas containing raw carbon nanotubes from the first reactor can be passed into the second reactor to be converted further, or a fresh carbon feed gas is added directly into the second reactor to continue the reaction. Similarly, the processes can be applied to the other reactors. Fourth, a new batch of freshly activated catalysts can be added into the first reactor to supplement the deactivated catalysts. Since the newly added catalysts have higher density than the raw carbon nanotube products, the newly added catalysts remain at the bottom of the vertical type of reactor. Thus, the process allows a good separation of the raw nanotube products from the catalysts and offers a significant improvement to the operational stability. Fifth, the carbon nanotube products collected from the last reactor are passed through a gas-solid separator such as a cyclone separator, filtered and stored in a container. Either porcelain or a cloth filter can be used. The products are further cooled down by treating with a cold gas or liquid such as cold air or cold water.

The feed gas can be CO or $C_1$-$C_8$ hydrocarbon containing compounds, including $C_1$-$C_6$ alkane, alkene, alkyne, cycloalkane, cycloalkene and benzene. Non-limiting examples of $C_1$-$C_6$ hydrocarbons include methane, ethane, propane, butane, pentane, hexane, ethene, propylene, butylenes, pentene, hexene, acetylene, propyne, cyclopentane, cyclopentene, cyclohexene, cyclohexane, isomers and mixtures thereof.

The catalysts used include single metal complexes, such as Fe, Co, and Ni or multi-component catalysts selected from Fe and at least one element selected from the group consisting of V, Cr, Mn, Mo, W, Nb, Ta and Re. The catalysts can be activated by passing a stream of hydrogen or CO at a temperature from about 350 to about 900° C. under a fluidization condition and the activated catalysts are then transported to the main fluidized-bed multistage reactor. The activated catalysts are present as metal nanoparticles having a diameter from about 1-1000 nm. The activated catalysts are preferably deposited on solid supports to form nano-agglomerates having a diameter from about 1-1000 μm.

The inert gas used includes, but is not limited to, nitrogen, helium, argon or a combination thereof. The reduction reaction is typically carried out at a temperature from about 350° C. to about 900° C., such as 350° C., 400° C., 450° C., 500° C., 550° C., 600° C., 650° C., 700° C., 750° C., 800° C., 850° C. or 900° C.

Although the carbon nanotubes can be grown at various temperatures using a multistage or multilayer reactor, preferably, the temperatures for the main reactor are kept at between about 500° C.-900° C. For example, the activated catalysts can be fed into the main reactor at a temperature from about 500 to about 900° C., such as 500, 550, 600, 650, 700, 750, 800, 850 or 900° C.

The sample can be added through spiral tubes, riser tubes, circulating tubes, discharging tube, pumping tube, or spiral stirring device. The materials can be moved into the next zone by circulating, gas blow or using mechanical device. The gas-solid separator includes cyclone separator and ceramic filter.

Example 1

Preparation of Multi-Wall Carbon Nanotubes Using a Single Reactor

A single stage reactor has an inner diameter of 500 mm and a height of 2.5 m. Multi-wall carbon nanotubes (MWNT) catalysts (1 kg) were added in a single portion to the reactor. The operation gas velocity is 0.05 m/s. The reaction was carried out for 5 h and product (13 kg) was obtained. The conversion for feed gas was 30%. Without being bound by any theory, the low conversion may be a result of poor fluidization conditions and the presence of channeling flow.

Preparation of Multi-Wall Carbon Nanotubes Using a Multistage Reactor without Adding New Catalysts.

As shown in FIG. 1, the first and the second reactors have diameters about 200 and 500 mm, respectively, and a height of 2.5 m. Multi-wall nanotube catalysts (1 kg) are added to the first stage reactor in one portion under an operating gas flow of 0.3 m/s. The second stage reactor contains no catalytic materials and has an operating gas flow of 0.05 m/s. The reaction was carried out for 30 minutes, the solid material in the first stage reactor undergoes volume expansion to about 250 times of the original volume and the weight of the material is about 5 kg. The average conversion is greater than 80% and the density of the material decreases to 120 g/L. The reaction was continued and the material in the first reactor starts to migrate into the second reactor. The reaction was continued for about 4 h and the material weighed about 30 kg. The density had decreased to 75 g/L and the volume expanded to about 2000 times. The average yield is about 60%. Use of a series of multiple reactors has the advantage of shortened reaction time compared to the use of a single reactor, and has provided a solution for fluidization of solids having various densities.

Preparation of Multi-Wall Carbon Nanotubes Using a Series of Multiple Reactors with the Addition of New Catalysts Catalysts were added continuously to the first reactor at a rate of 400 g/h. The operation gas velocity is 0.2 m/s. Increase the temperature to 50° C. results in enhanced yield and improved conversion (>96%). The operation gas velocity in the second reactor is 0.075 m/s. The average conversion is greater than 85%. After the reaction was carried out for 5 h, 70 kg MWNT was obtained. Compared to the use of single stage reactor, the productivity, feed gas yield and catalysts efficiency are greatly enhanced.

Preparation of Single-Wall Carbon Nanotubes Using a Multistage Reactor

The apparatus is shown in FIG. 1. Single-wall carbon nanotube (SWNT) catalysts (1 kg) were added to the first reactor at an operation gas velocity of 1 m/s. The second reactor has an operation gas velocity of 0.05 m/s. As the reaction progresses, the catalysts in the first reactor was carried out into the second reactor and continue to react with the feed gas in the second reactor. In the first reactor, the catalysts have high activity, which allow high space velocity. Without being bound by any theory, such a reaction condition facilitates the nucleation and formation of SWNT. In comparison, the SWNT is in the growth stage in the second reactor and the catalysts have lower reactivity. Reduce the space velocity can improve the yield of feed gas for the formation of SWNT. Average conversion was greater than 90%. The product SWNT has a selectivity of greater than 90%. After purification, the SWNT obtained has an average surface area of 1000 m$^2$/g determined by Brunauer, Emmett and Teller (BET) experiments.

Example 2

Preparation of Multi-Wall Carbon Nanotubes Using a Multilayer Reactor

FIG. 2A illustrates a double-layer fluidization-bed reactor. The reactor has an operation gas flow rate of about 0.2 m/s. The plate distributors were used. The lower plate distributor has an opening of about 1 mm and an opening ratio of about 0.1%. The upper plate distributor has an opening of about 20 mm and an opening ratio of about 20%. Activated MWNT catalysts (1 kg) were added to the lower zone of the reactor and the reaction was carried out for 20 minutes. A volume expansion was observed and some of the particles passed through the 20 mm plate distributor into upper reaction zone of the reactor to establish new density region. The feed gas was further converted. Using the apparatus of FIG. 2A, the yield increased from 80% to 90%. When three plate distributors were used, the conversion can reach greater than 96%.

FIGS. 2D and 2E illustrate two multilayer reactors. The upper plate distributors have an opening ratio of about 3-30% and an opening dimension of about 3-20 mm. Since an outer or an inner circulating tube is attached to the reactor, it is easier to control the height and stability of the upper zone. The conversion is constantly greater than 95%.

Example 3

Preparation of MWNT Using a Combination of Multilayered Fluidized-Bed Reactors

FIGS. 3A and 3B show two multistage and multilayered reaction apparatus. As shown in FIGS. 3A-B, the catalysts were added from the top layer or zone and the nanotube products were obtained from the lower layer or zone. The lower layer or zone in reactor I mostly contains a mixture of carbon nanotubes and catalysts, where the weight ratio of carbon nanotubes to catalyst is high. In this zone, the carbon nanotubes have low density, low activity and low starting material conversion. To improve the yield of the carbon nanotubes, fresh catalysts were added to the top layer or zone of the reactor I. In reactor I, the upper distributing plate has an opening ratio of 0.01-5% and an opening dimension of about 0.2-3 mm. The solid material was added into reactor II through a transporting tube 362. The superficial velocity was about 0.05-0.6 m/s. The exhausted gas from reactor II was mixed with the carbon gas of reactor I and further reacted in the lower layer or zone of reactor I. Alternatively, the solid material in reactor II was transported into reactor I through circulating tube 360 and further reacted. The conversion for carbon gas is nearly 100%.

Example 4

Preparation of Single Wall or Double Wall Carbon Nanotubes Using a Combination of Riser-Fluidized Bed Reactor FIG. 4A shows reactor 420 having a diameter about 50 mm and a height of 0.4 m. To storage container 410 was added SWNT or double wall carbon nanotube (DWNT) catalysts (150 g) and passed a stream of Ar or $N_2$ gas at a rate of 0.1 m/s. The catalysts are in fluidized condition. The rising tube 430 has a diameter of 5 mm and a length of 120 m and is in a winding spiral form. A carbon gas was passed at a rate of 3 m/s. Storage tank 410 and riser 430 were both heated to about 650-950° C. Using Venturi tube for feeding the material, the catalysts were siphoned into the riser. The feeding rate is about 0.3 g/s. The catalysts was resided in the riser for about 40 s and then transported to reactor 420 for further reaction. The gas flow rate in the reactor is about 0.15 m/s. The products were collected after passing through a cyclone separator. The selectivity for SWNT and DWNT is greater than 95%. The products contain about 50% SWNT or MWNT. The production speed is about 600 g/h.

As shown in FIG. 4B, carbon gas was no longer passing through, instead replaced by Ar or $N_2$ gas at a rate of 5 m/s. The feeding rate is about 0.4 g/s. The riser has a length of about 0.6 m. The catalysts in storage tank 415 were continuously fed into reactor 425 through riser 435 for about 10 minutes. In general, the selectivity for SWNT and DWNT is greater than 90%. The products contain about 30% SWNT or MWNT.

In comparison, the catalysts (30 g) were added directly into reactor 420, with a gas flow rate of 0.15 m/s and reacted for about 10 minutes. The products contain mostly multi-walled carbon nanotubes. The selectivity for SWNT and DWNT was poor (~30%).

Example 5

Preparation of MWNT Using Nesting Parallel Ring-Like Reactors

As shown in FIG. 5A, a heater 550 is attached to the outer reactor 510. The inner reactor is indirectly heated up through the contact of the solids residing between the inner reactor and outer reactor. The apparatus is suitable for less heat sensitive system. Since the fresh catalysts have higher activity, the catalysts do not require significant heating.

As shown in FIG. 5B, the catalysts were mainly transported to the exterior ring-like reactor. The heat was transported to the inner reactor easily and efficiently. The reaction gas flow rates are 0.1 m/s for inactive catalysts and 0.3 m/s for fresh catalysts. The conversion was about 83%.

Example 6

Preparation of Carbon Nanotubes Using a Multistage Step-Shape Reactor Having a Stirring Device As shown in FIG. 6, the multistage reactor has four stages. In the first stage, the reactor has a diameter about 50 mm and an operation gas flow rate of 1 m/s. In the subsequent stages of the reactor, the diameters are 100 mm, 200 mm and 350 mm, respectively. The gas velocity gradually decreases at different stages with in the reactor. The lowest gas velocity is about 0.02 m/s. Since active catalysts have a high density, these catalysts generally deposit in the first stage of the reactor. High operation gas velocity can be used to enhance the productivity. As to the reaction progresses, the catalysts are gradually deactivated. Since the densities of the gradually deactivated catalysts continuously decrease, the deactivated catalysts mainly float at the later stages of the reactor, in particular, the last two stages of the reactor. The gas velocity at the last two stages are as low as 0.02-0.03 m/s, which allow the gas to have longer stay time and a high conversion. A 95% conversion has been obtained.

While the invention has been described by way of examples and in terms of the specific embodiments, it is to be understood that the invention is not limited to the disclosed embodiments. To the contrary, it is intended to cover various modifications and similar arrangements as would be apparent to those skilled in the art. For example, various possible arrangements of the inlets, outlets, gas-solid distributors, plate distributors, circulating tubes and catalyst activation reactors exist and the embodiments are not limited to the ones described herein. Therefore, the scope of the appended claims should be accorded the broadest interpretation to encompass all such modifications and similar arrangements. All publications, patents, and patent applications cited herein are hereby incorporated by reference in their entirety and for all purposes.

What is claimed is:

1. A multistage reaction apparatus for continuous production of carbon nanotubes, comprising:
    a catalyst activation reactor having an activation feed inlet and a catalyst gas outlet, wherein the activation inlet is configured to receive an inactive catalyst and a reducing gas, wherein the catalyst activation reactor is configured to produce an activated catalyst by reacting the inactive catalyst with the reducing gas at a temperature between about 350° C. and about 900° C., wherein the catalyst gas outlet is configured to output the activated catalyst;
    an array of n interconnected fluidized-bed reactors, wherein n is an integer of at least 2, wherein each of the n interconnected fluidized-bed reactors comprises a reaction feed inlet, a gas distributor mounted inside the fluidized-bed reactor, and an exhaust gas-solid separator outlet, wherein the first fluidized-bed reactor in the array of n interconnected fluidized-bed reactors is in fluidic connection with the catalyst gas outlet of the catalyst activation reactor and is configured to receive the activated catalyst from the catalyst gas outlet, wherein the first fluidized-bed reactor is configured to receive a carbon feed and a gas mixture through its associated reaction feed inlet, wherein the first fluidized-bed reactor is configured to produce carbon nanotubes by reacting the carbon feed, the gas mixture with the activated catalyst at a temperature between about 500° C. and about 900° C., wherein one of the n interconnected fluidized-bed reactors is configured to output the carbon nanotubes to the subsequent adjacent reactor in the n interconnected fluidized-bed reactors, wherein at least one of the n interconnected fluidized-bed reactors comprises a plurality of reaction zones, wherein the plurality of reaction zones are positioned along the gravitation direction, wherein the plurality of reaction zones have increased volumes along the downward direction; and
    a product outlet on the nth fluidized-bed reactor in the array of n interconnected fluidized-bed reactors, the product outlet being configured to output the carbon nanotubes.

2. The multistage reaction apparatus of claim 1, wherein the reaction feed inlet of one of the n interconnected fluidized-bed reactors is coupled to the exhaust gas-solid separator outlet of the subsequent adjacent reactor in the n interconnected fluidized-bed reactors.

3. The multistage reaction apparatus of claim 1, further comprising a product gas-solid separator coupled to the product outlet, wherein the product gas-solid separator is configured to separate the carbon nanotubes from unwanted gas exiting the product outlet.

4. The multistage reaction apparatus of claim 1, wherein the reaction feed inlet in at least one of the n interconnected fluidized-bed reactors is positioned at the bottom of the fluidized-bed reactor, wherein the exhaust gas-solid separator outlet of the fluidized-bed reactor is positioned at the top of the fluidized-bed reactor.

5. The multistage reaction apparatus of claim 1, wherein the inactivated catalyst comprises a material selected from the group consisting of metal complexes, metal salts, and metal oxides.

6. The multistage reaction apparatus of claim 1, wherein the reducing gas comprises hydrogen, and wherein the inert gas comprises nitrogen.

7. The multistage reaction apparatus of claim 1, wherein the activated catalyst comprises metal nanoparticles.

8. The multistage reaction apparatus of claim 1, wherein the carbon feed comprises a C1-C6 hydrocarbon compound, and wherein the gas mixture comprises hydrogen and nitrogen.

9. The multistage reaction apparatus of claim 1, wherein the array of n interconnected fluidized-bed reactors include a first fluidized-bed reactor and a second fluidized-bed reactor, wherein the first fluidized-bed reactor comprises a first reaction zone and a second reaction zone, wherein the second fluidized-bed reactor comprises a first reaction zone and a second reaction zone, wherein the first reaction zone of the first fluidized-bed reactor is connected to the second reaction zone of the second fluidized-bed reactor, wherein the second reaction zone of the first fluidized-bed reactor is connected to the first reaction zone of the second fluidized-bed reactor.

10. The multistage reaction apparatus of claim 9, wherein the second fluidized-bed reactor comprises an inner circulating tube that provides fluidic connection between the first reaction zone and the second reaction zone of the second fluidized-bed reactor.

11. The multistage reaction apparatus of claim 9, wherein the first fluidized-bed reactor further comprises a third reaction zone in between and in fluid communication with the first reaction zone and the second reaction zone of the first fluidized-bed reactor.

12. The multistage reaction apparatus of claim 9, wherein at least one of the first fluidized-bed reactor or the second fluidized-bed reactor comprises a plate distributor that defines the first reaction zone and the second reaction zone and allow carbon nanotubes to transport between reaction zones.

13. The multistage reaction apparatus of claim 1, wherein the gas-solid separator comprises a cyclone separator or a filter.

14. The multistage reaction apparatus of claim 1, wherein at least one of the n interconnected fluidized-bed reactors comprises a stirring device configured to stir the carbon feed, the gas mixture, the activated catalyst, and the carbon nanotubes.

15. The multistage reaction apparatus of claim 1, further comprising a magnetic system configured to produce a magnetic field in at least one of the n interconnected fluidized-bed reactors.

16. A multistage reaction apparatus for continuous production of carbon nanotubes, comprising:
- a catalyst activation reactor having an activation feed inlet and a catalyst gas outlet, wherein the activation inlet is configured to receive an inactive catalyst and a reducing gas, wherein the catalyst activation reactor is configured to produce an activated catalyst by reacting the inactive catalyst with the reducing gas, wherein the catalyst gas outlet is configured to output the activated catalyst;
- a first fluidized-bed reactor comprising a first reaction zone, a second reaction zone, a reaction feed inlet, and an exhaust gas-solid separator outlet, wherein the first fluidized-bed reactor is configured to receive a carbon feed and a gas mixture through its associated reaction feed inlet and to receive the activated catalyst from the catalyst gas outlet of the catalyst activation reactor, wherein the first fluidized-bed reactor is configured to produce carbon nanotubes by reacting the carbon feed, the gas mixture with the activated catalyst;
- a second fluidized-bed reactor comprising a first reaction zone, a second reaction zone, a reaction feed inlet, and an exhaust gas-solid separator outlet, wherein the first reaction zone of the first fluidized-bed reactor is connected to the second reaction zone of the second fluidized-bed reactor to allow transport of the carbon nanotubes between the first fluidized-bed reactor and the second fluidized-bed reactor, wherein the second reaction zone of the first fluidized-bed reactor is connected to the first reaction zone of the second fluidized-bed reactor to allow transport of the carbon nanotubes between the first fluidized-bed reactor and the second fluidized-bed reactor; and
- a product outlet in one of the first fluidized-bed reactor and the second fluidized-bed reactor, the product outlet being configured to output the carbon nanotubes.

17. The multistage reaction apparatus of claim 16, wherein the reaction feed inlet of the first fluidized-bed reactor is coupled to the exhaust gas-solid separator outlet of the second fluidized-bed reactor.

18. The multistage reaction apparatus of claim 16, wherein the reaction feed inlet in the first fluidized-bed reactor is positioned at the bottom of the fluidized-bed reactor, wherein the exhaust gas-solid separator outlet of the second fluidized-bed reactor is positioned at the top of the fluidized-bed reactor.

19. The multistage reaction apparatus of claim 16, wherein the activated catalyst comprises metal nanoparticles.

20. The multistage reaction apparatus of claim 16, wherein the carbon feed comprises a C1-C6 hydrocarbon compound, and wherein the gas mixture comprises hydrogen and nitrogen.

21. The multistage reaction apparatus of claim 16, wherein the first reaction zone and the second reaction zone are positioned along the gravitation direction, wherein the first reaction zone and the second reaction zone have increased volumes along the downward direction.

22. The multistage reaction apparatus of claim 16, wherein the first reaction zone and the second reaction zone are positioned along the gravitation direction, wherein the first reaction zone and the second reaction zone have substantially the same dimension in the horizontal direction.

23. The multistage reaction apparatus of claim 16, wherein the second fluidized-bed reactor comprises an inner circulating tube that provides fluidic connection between the first reaction zone and the second reaction zone of the second fluidized-bed reactor.

24. The multistage reaction apparatus of claim 16, wherein the first fluidized-bed reactor further comprises a third reaction zone in between and in fluid communication with the first reaction zone and the second reaction zone of the first fluidized-bed reactor.

25. The multistage reaction apparatus of claim 16, wherein at least one of the first fluidized-bed reactor or the second fluidized-bed reactor comprises a plate distributor that defines the first reaction zone and the second reaction zone and allow carbon nanotubes to transport between reaction zones.

\* \* \* \* \*